United States Patent
Takeda

(10) Patent No.: US 9,568,781 B2
(45) Date of Patent: Feb. 14, 2017

(54) LIQUID CRYSTAL DISPLAY DEVICE

(71) Applicant: Japan Display Inc., Minato-ku (JP)

(72) Inventor: Arihiro Takeda, Tokyo (JP)

(73) Assignee: Japan Display Inc., Minato-ku (JP)

( * ) Notice: Subject to any disclaimer, the term of this patent is extended or adjusted under 35 U.S.C. 154(b) by 125 days.

(21) Appl. No.: 14/570,182

(22) Filed: Dec. 15, 2014

(65) Prior Publication Data

US 2016/0170271 A1  Jun. 16, 2016

(30) Foreign Application Priority Data

Dec. 27, 2013 (JP) ................................. 2013-270959

(51) Int. Cl.
- *G02F 1/1335* (2006.01)
- *G02F 1/1337* (2006.01)
- *G02F 1/1343* (2006.01)

(52) U.S. Cl.
CPC ... *G02F 1/134309* (2013.01); *G02F 1/133514* (2013.01); *G02F 1/133555* (2013.01); *G02F 2001/134345* (2013.01); *G02F 2201/52* (2013.01)

(58) Field of Classification Search
CPC combination set(s) only.
See application file for complete search history.

(56) References Cited

U.S. PATENT DOCUMENTS

| | | | |
|---|---|---|---|
| 2004/0135945 A1* | 7/2004 | Choi .................. | G02F 1/13394 349/114 |
| 2006/0044496 A1* | 3/2006 | Tsuchiya ........... | G02F 1/133371 349/114 |
| 2007/0236635 A1* | 10/2007 | Morimoto ......... | G02F 1/133555 349/114 |
| 2010/0195028 A1* | 8/2010 | Kubota ............. | G02F 1/134363 349/106 |
| 2014/0231790 A1 | 8/2014 | Fujino | |

FOREIGN PATENT DOCUMENTS

| | | |
|---|---|---|
| JP | 2001-296523 | 10/2001 |
| JP | 2008-233803 | 10/2008 |
| WO | 2013/051428 A1 | 4/2013 |

* cited by examiner

*Primary Examiner* — Wen-Ying P Chen
(74) *Attorney, Agent, or Firm* — Oblon, McClelland, Maier & Neustadt, L.L.P.

(57) ABSTRACT

According to one embodiment, a liquid crystal display device includes a first substrate including a first transmissive electrode, a second transmissive electrode, a third transmissive electrode, a fourth transmissive electrode, a fifth transmissive electrode, and a reflective electrode, a second substrate including a first color filter opposed to the first transmissive electrode and the fourth transmissive electrode, a second color filter opposed to the second transmissive electrode and the fifth transmissive electrode, a third color filter opposed to the third transmissive electrode, and a fourth color filter opposed to the reflective electrode, and a liquid crystal layer held between the first substrate and the second substrate.

18 Claims, 9 Drawing Sheets

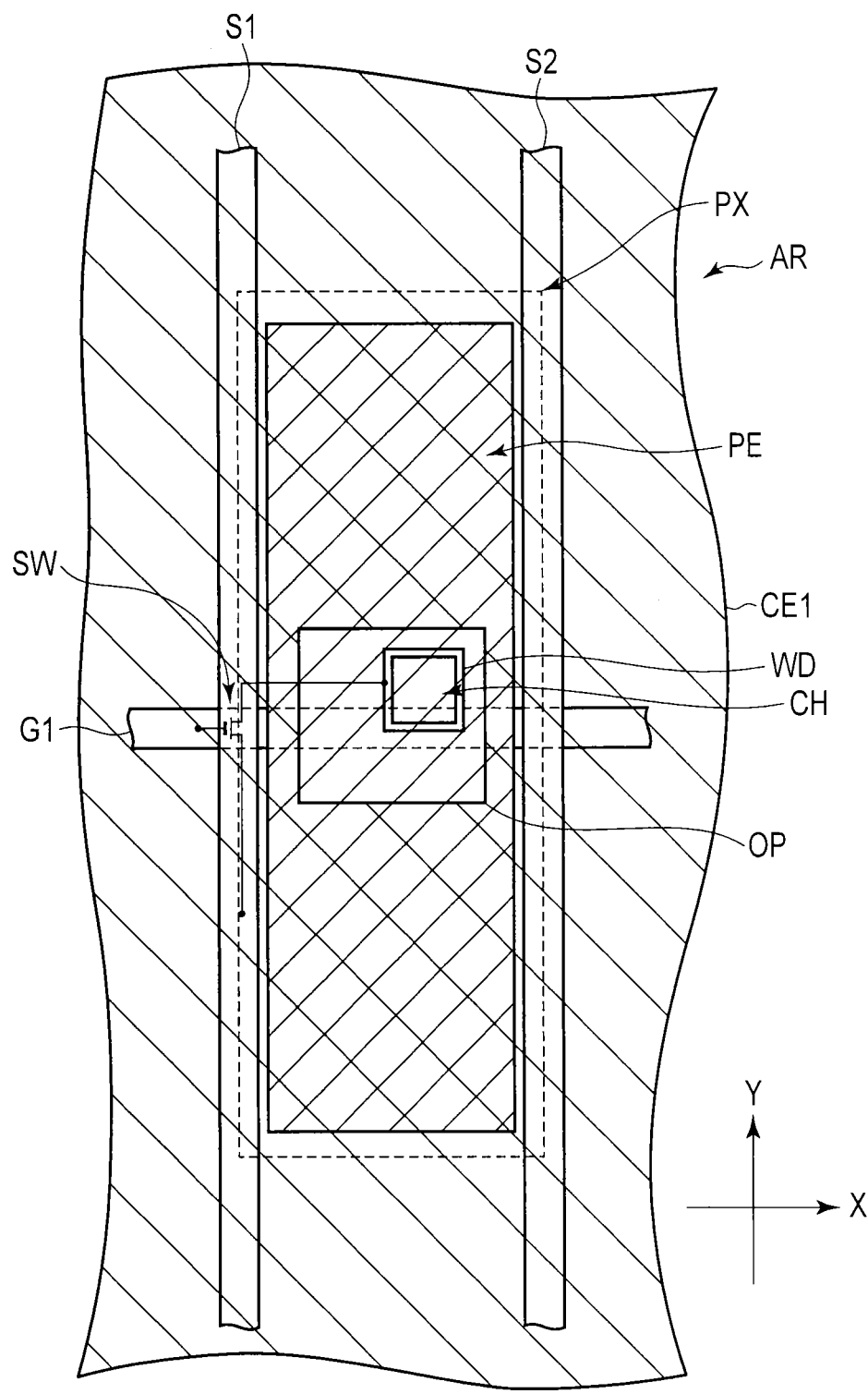
F I G. 2

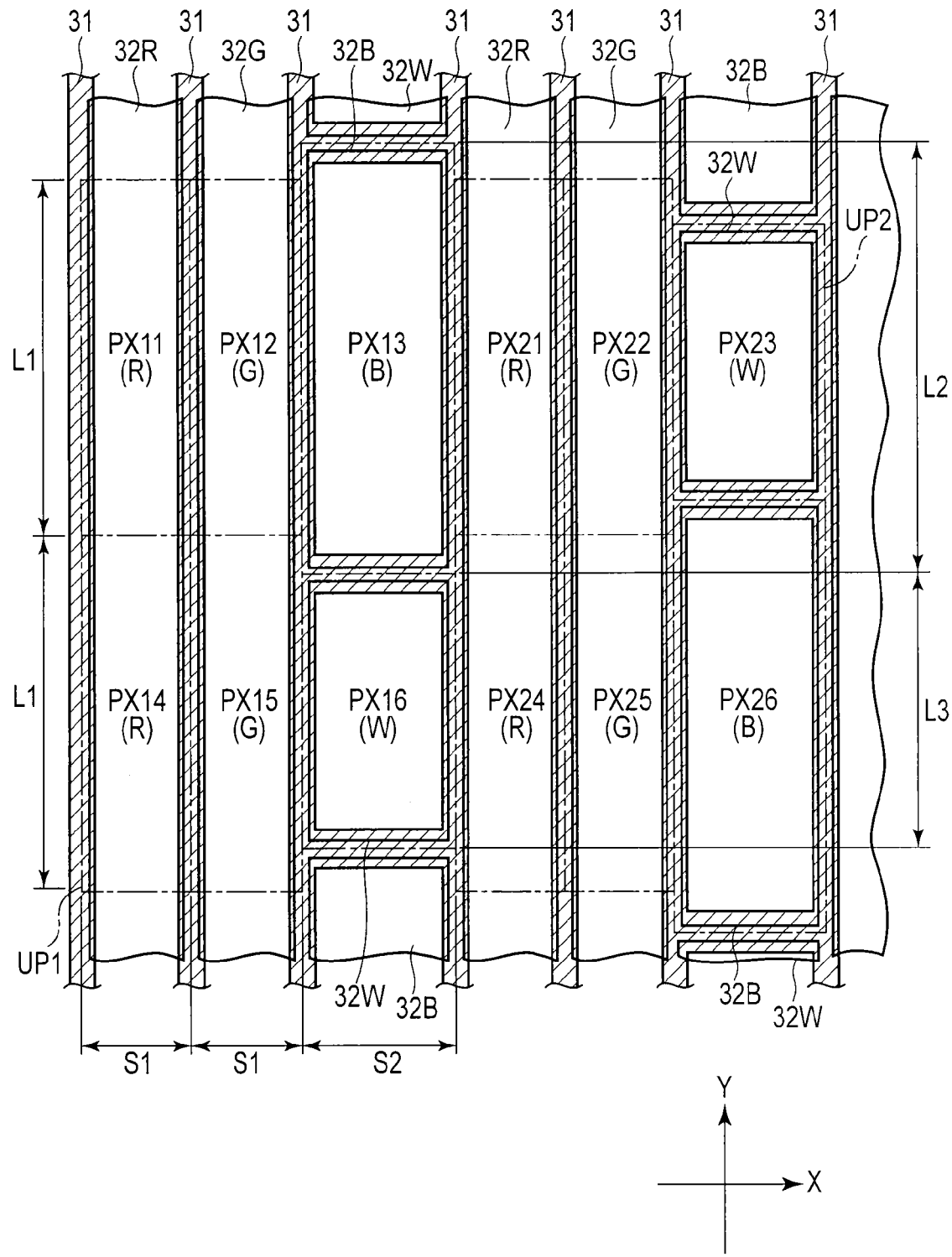
F I G. 5

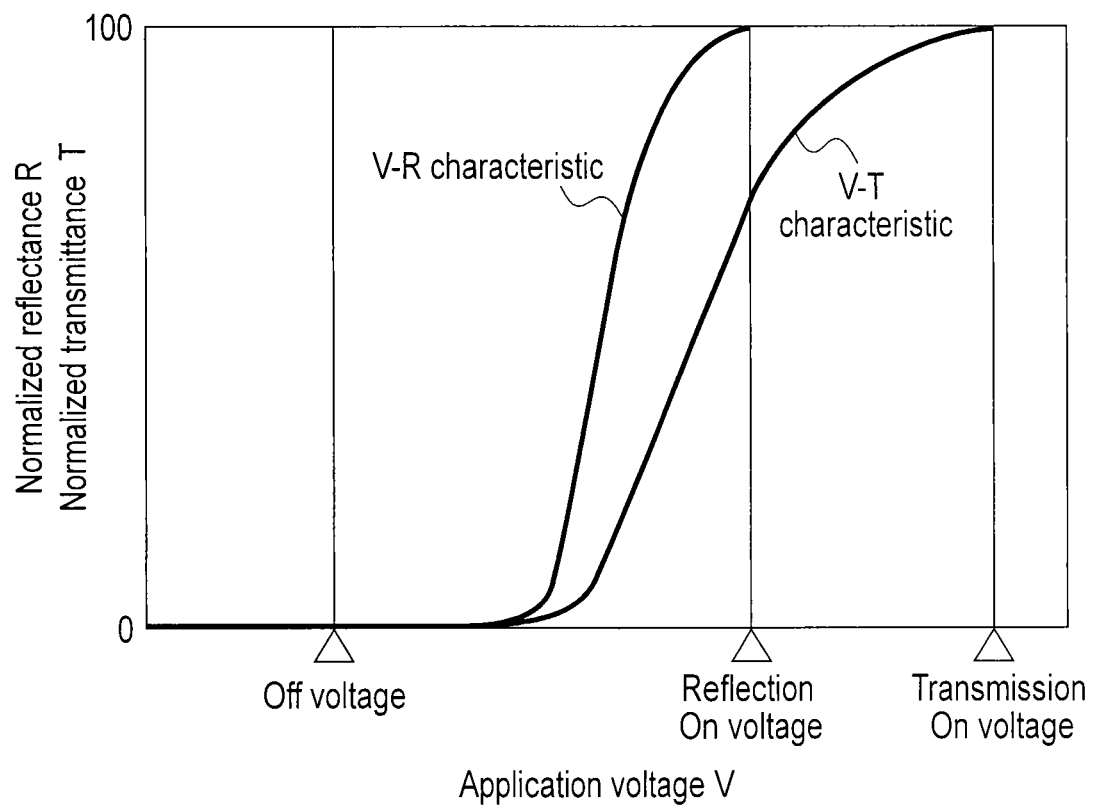
F I G. 8

LIQUID CRYSTAL DISPLAY DEVICE

CROSS-REFERENCE TO RELATED APPLICATIONS

This application is based upon and claims the benefit of priority from Japanese Patent Application No. 2013-270959, filed Dec. 27, 2013,the entire contents of which are incorporated herein by reference.

FIELD

Embodiments described herein relate generally to a liquid crystal display device.

BACKGROUND

In recent years, in color display devices, methods for improving display luminance have been proposed. As an example, there has been proposed a liquid crystal display device in which one unit pixel is constituted by arranging a red (R) pixel, a green (G) pixel, a blue (B) pixel and a white (W) pixel in one row.

In this liquid crystal display device, when an image is displayed indoors, transmissive light of the white pixel contributes to display. Thus, even if the backlight unit is driven at low luminance, the display luminance is enhanced and the visibility is secured. On the other hand, when an image is displayed outdoors, ambient light (e.g. sunlight) is reflected and glare occurs. Thus, in order to secure the visibility, it is necessary to drive the backlight unit at high luminance, leading to an increase in power consumption.

BRIEF DESCRIPTION OF THE DRAWINGS

FIG. 2 is a plan view which schematically illustrates a structure example of one pixel PX of an array substrate AR which is applicable to the liquid crystal display device of the embodiment.

FIG. 5 is a plan view which schematically illustrates an example of a layout of pixels and color filters in the embodiment.

FIG. 8 is a view for explaining a relationship of a normalized transmittance and a normalized reflectance, relative to a liquid crystal application voltage.

DETAILED DESCRIPTION

Figure 1:
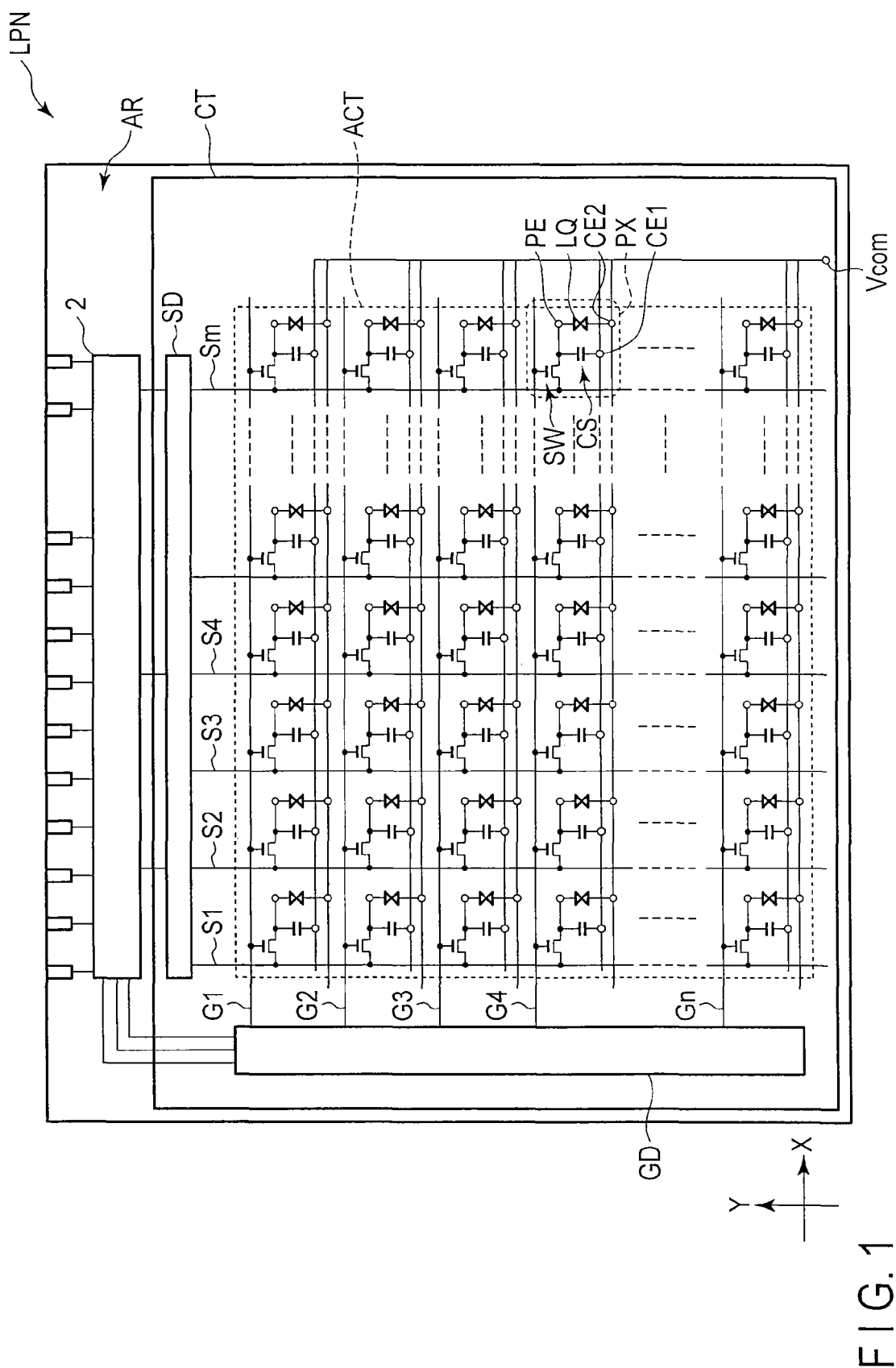
FIG. 1 is a view which schematically illustrates a structure and an equivalent circuit of a liquid crystal display panel LPN which constitutes a liquid crystal display device according to an embodiment.

In general, according to one embodiment, a liquid crystal display device includes: a first substrate including a first transmissive electrode, a second transmissive electrode neighboring the first transmissive electrode in a first direction, a third transmissive electrode neighboring the second transmissive electrode in the first direction, a fourth transmissive electrode neighboring the first transmissive electrode in a second direction, a fifth transmissive electrode neighboring the second transmissive electrode in the second direction, and a reflective electrode neighboring the third transmissive electrode in the second direction; a second substrate including a first color filter extending in the second direction and opposed to the first transmissive electrode and the fourth transmissive electrode, a second color filter extending in the second direction and opposed to the second transmissive electrode and the fifth transmissive electrode, a third color filter opposed to the third transmissive electrode, and a fourth color filter opposed to the reflective electrode; and a liquid crystal layer held between the first substrate and the second substrate.

According to another embodiment, a liquid crystal display device includes: a first substrate including a first common electrode, a first transmissive electrode opposed to the first common electrode, a second transmissive electrode opposed to the first common electrode and neighboring the first transmissive electrode in a first direction, a third transmissive electrode opposed to the first common electrode and neighboring the second transmissive electrode in the first direction, and a reflective electrode opposed to the first common electrode and neighboring the third transmissive electrode in a second direction; a second substrate including a first color filter opposed to the first transmissive electrode, a second color filter opposed to the second transmissive electrode, a third color filter opposed to the third transmissive electrode, a fourth color filter opposed to the reflective electrode, and a second common electrode opposed to the first to third transmissive electrodes and the reflective electrode and having a potential equal to a potential of the first common electrode; and a liquid crystal layer held between the first substrate and the second substrate.

Embodiments will now be described in detail with reference to the accompanying drawings. Incidentally, the disclosure is merely an example, and proper changes, which are easily conceivable by a skilled person within the spirit of the invention, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements, which have functions that are identical or similar to those of the structural elements described in connection with preceding drawings, are denoted by like reference numerals, and an overlapping detailed description thereof is omitted unless otherwise necessary.

FIG. 1 is a view which schematically illustrates a structure and an equivalent circuit of a liquid crystal display panel LPN which constitutes a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT. The liquid crystal display panel LPN includes an active area ACT which displays an image. The active area ACT corresponds to a region where the liquid crystal layer LQ is held between the array substrate AR and the counter-substrate CT, has a rectangular shape, for instance, and is composed of a plurality of pixels PX which are arranged in a matrix.

The array substrate AR includes, in the active area ACT, a plurality of gate lines G (G1 to Gn) extending in a first direction X, a plurality of source lines S (S1 to Sm) extending in a second direction Y crossing the first direction X, a switching element SW which is electrically connected to the gate line G and source line S in each pixel PX, a pixel electrode PE which is electrically connected to the switching element SW in each pixel PX, and a first common electrode CE1 which is opposed to the pixel electrode PE. A storage capacitor CS is formed, for example, between the first common electrode CE1 and the pixel electrode PE.

On the other hand, the counter-substrate CT includes, for example, a second common electrode CE2 which is opposed to the pixel electrode PE via the liquid crystal layer LQ.

Each of the gate lines G is led out of the active area ACT and is connected to a first driving circuit GD. Each of the source lines S is led out of the active area ACT and is connected to a second driving circuit SD. At least parts of the first driving circuit GD and second driving circuit SD are formed on, for example, the array substrate AR, and are connected to a driving IC chip 2. The driving IC chip 2 incorporates a controller which controls the first driving circuit GD and second driving circuit SD, and functions as a signal supply source for supplying necessary signals for driving the liquid crystal display panel LPN. In the example illustrated, the driving IC chip 2 is mounted on the array substrate AR, on the outside of the active area ACT of the liquid crystal display panel LPN.

The first common electrode CE1 and second common electrode CE2 have the same potential, and each of them extends over substantially the entirety of the active area ACT and is formed commonly over a plurality of pixels PX. The first common electrode CE1 and second common electrode CE2 are led out of the active area ACT and are connected to a power supply module Vcom. The power supply module Vcom is formed, for example, on the array substrate AR on the outside of the active area ACT, and is electrically connected to the first common electrode CE1 and also electrically connected to the second common electrode CE2 via an electrically conductive member (not shown). At the power supply module Vcom, for example, a common potential is supplied to the first common electrode CE1 and second common electrode CE2.

FIG. 2 is a plan view which schematically illustrates a structure example of one pixel PX of the array substrate AR which is applicable to the liquid crystal display device of the embodiment.

The array substrate AR includes a gate line G1, a source line S1, a source line S2, a switching element SW, a first common electrode CE1, and a pixel electrode PE. In the example illustrated, as indicated by a broken line in FIG. 2, the pixel PX has a rectangular shape with a pair of short sides parallel to the first direction X, and a pair of long sides parallel to the second direction Y. Incidentally, the first direction X and second direction Y are perpendicular to each other.

The gate line G1 extends in the first direction X. The source line S1 and source line S2 are disposed with a distance in the first direction X, and extend in the second direction Y, respectively. The length of the pixel PX in the first direction X is substantially equal to the pitch of neighboring source lines in the first direction X. The length of the pixel PX in the second direction Y is substantially equal to the pitch of neighboring gate lines in the second direction Y.

In the pixel PX illustrated, the source line S1 is located at a left side end portion, and is disposed to extend over a boundary between the pixel PX and a pixel neighboring on the left side. The source line S2 is located at a right side end portion, and is disposed to extend over a boundary between the pixel PX and a pixel neighboring on the right side. The gate line G1 is disposed in a manner to cross a central part of the pixel PX. In the present embodiment, as illustrated, there is no storage capacitance line which crosses the pixel PX for forming a storage capacitance CS.

The switching element SW is composed of, for example, an n-channel thin-film transistor (TFT). Although a detailed illustration is omitted, the switching element SW includes a semiconductor layer of, e.g. polysilicon, a gate electrode connected to the gate line G1, a source electrode which is connected to the source line S1 and is put in contact with the semiconductor layer, and a drain electrode WD which is in contact with the semiconductor layer.

For example, as indicated by upper left to lower right hatching lines in the Figure, the first common electrode CE1 is disposed over substantially the entirety of the pixel PX, and further extends from the pixel PX beyond the source line S1 and source line S2 in the first direction X, and also extends in the second direction Y. Specifically, the first common electrode CE1 is opposed to the source line S1 and source line CE2 and is formed continuously over pixels neighboring the pixel PX in the first direction X. In addition, the first common electrode CE1 is formed continuously over pixels neighboring the pixel PX in the second direction Y. Furthermore, although not described in detail, the first common electrode CE1 is disposed over substantially the entirety of the active area which displays an image, and a part thereof is led out of the active area and electrically connected to the power supply module, as described above. An opening OP for exposing the drain electrode WD is formed in the first common electrode CE1.

In the meantime, the first common electrode CE1 may be formed such that, while the first common electrode CE1 is disposed over substantially the entirety of the pixel PX, the first common electrode CE1 is made discontinuous at an area overlapping the gate line G1, the first common electrode CE1 extends from the pixel PX over the source line S1 and source line S2 in the first direction X, the first common electrode CE1 is opposed to the source line S1 and source line S2, and the first common electrode CE1 is continuously formed in a strip shape over pixels neighboring the pixel PX in the first direction X.

As indicated by lower left to upper right hatching lines in the Figure, the pixel electrode PE is formed in an island shape in the pixel PX, and is opposed to the first common electrode CE1. Incidentally, in the example illustrated, although only the pixel electrode PE disposed in the pixel PX is depicted, similar pixel electrodes are also disposed in other pixels neighboring the pixel PX in the first direction X and second direction Y. The pixel electrode PE is electrically connected to the drain electrode WD of the switching element SW via a contact hole CH. The shape of the pixel electrode PE illustrated corresponds to, for example, the shape of the pixel PX, and is a rectangular shape having a less length in the first direction X than in the second direction Y. The contact hole CH is located at a substantially central part of the pixel electrode PE. Incidentally, a part of the pixel electrode PE may extend to positions overlapping the source line S1 and source line S2.

In the present embodiment, the structure of each pixel of the active area is the same as in the above-described structure example. However, the active area includes pixels of different pixel sizes, i.e. different lengths in the first direction X and second direction Y.

Figure 3:
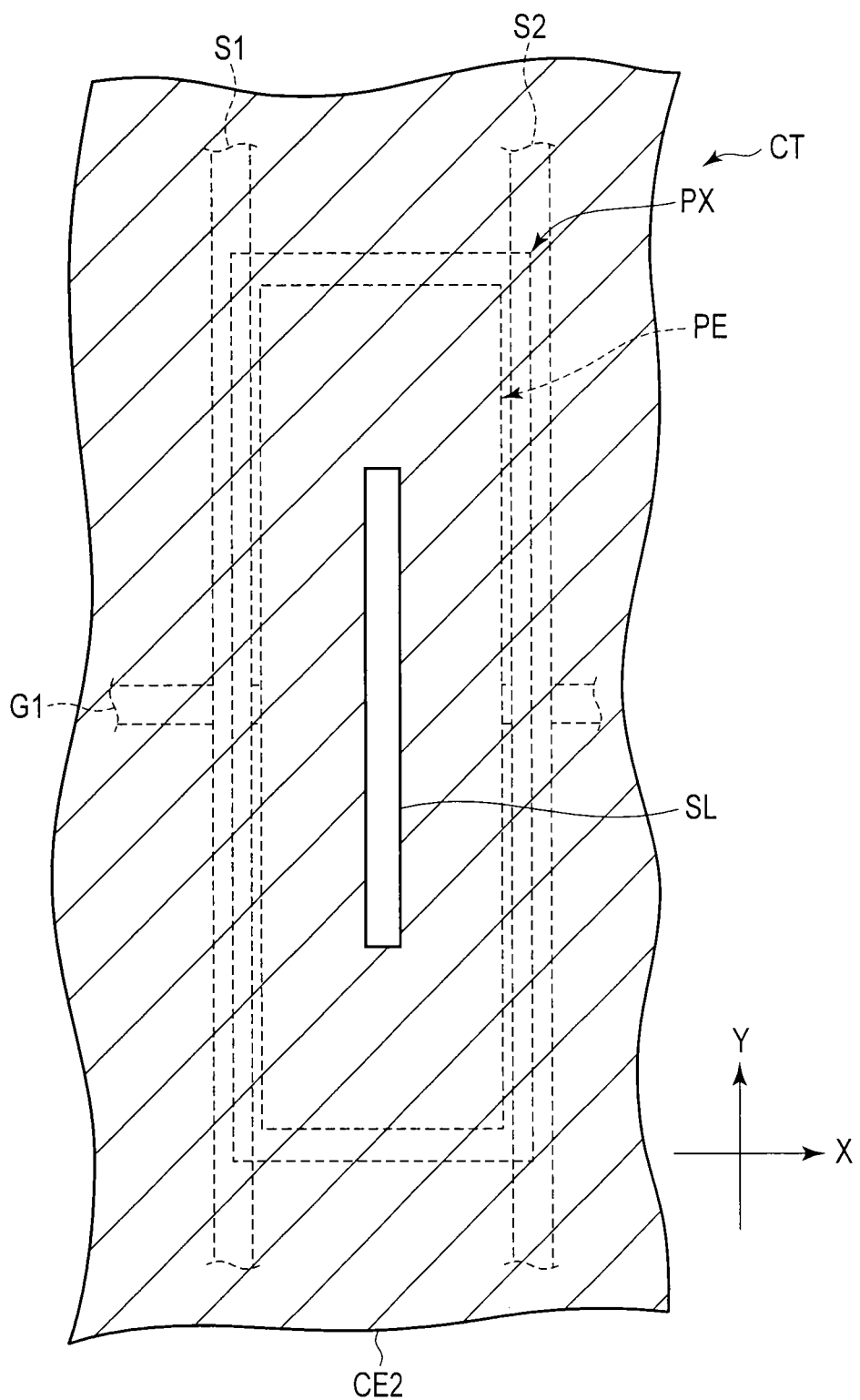
FIG. 3 is a plan view which schematically illustrates a structure example of one pixel PX of a counter-substrate CT which is applicable to the liquid crystal display device of the embodiment.

FIG. 3 is a plan view which schematically illustrates a structure example of one pixel PX of the counter-substrate CT which is applicable to the liquid crystal display device of the embodiment. FIG. 3 shows only structural parts that are necessary for the description, and the source line S1, source line S2, gate line G1, and pixel electrode PE, which are main parts of the array substrate, are indicated by broken lines, and the depiction of the first common electrode is omitted.

The counter-substrate CT includes a second common electrode CE2, etc. The second common electrode CE2 is disposed over the entirety of the pixel PX, and is opposed to the pixel electrode PE. In addition, the second common electrode CE2 extends from the pixel PX in the first direction X and the second direction Y, and is located also above the source line S1 and source line S2. Specifically, although not described in detail, the second common electrode CE2 is disposed continuously over pixels neighboring on the right side and left side along the first direction X of the pixel PX, and over pixels neighboring on the upper side and lower side along the second direction Y of the pixel PX. Furthermore, although not described in detail, the second common electrode CE2 is disposed over almost the entirety of the active area.

A slit SL is formed in the second common electrode CE2 at a position opposed to the pixel electrode PE. In the example illustrated, the slit SL is formed in a strip shape extending in the second direction Y, and is located substantially at a central part of the pixel PX. This slit SL corresponds to an alignment control member which mainly controls the alignment of liquid crystal molecules. In the meantime, instead of the slit, some other alignment control member, such as a projection stacked on the second common electrode CE2, may be disposed, if such an alignment control member has a function of controlling the alignment of liquid crystal molecules.

By applying the slit SL, which extends in the second direction Y, to the rectangular pixel PX having the paired short sides parallel to the first direction and the paired long sides parallel to the second direction Y, the distance from the slit SL to the end portions of the pixel PE is reduced in all directions of one pixel. Thus, an inclined electric field avoiding the slits SL, which will be described later, is produced between the slit SL and the end portions of the pixel electrode, and the response speed of liquid crystal molecules can be improved.

In the meantime, the shape of the slit SL is not limited to the example illustrated, and may be, for instance, a strip shape extending in the first direction X, or a cross shape. In the case of the strip-shaped slit SL extending in the first direction X, it is desirable that the slit SL be formed at a position overlapping the gate line G1. In addition, when the cross-shaped slit SL is applied, it is desirable that a transverse slit extending in the first direction X be formed at a position overlapping the gate line G1. By the slit being formed at the position overlapping the gate line G1, it becomes possible to execute an alignment control for forming one pixel in a multi-domain configuration, and to reduce a loss in transmittance or reflectance of the area overlapping the slit, thereby improving the luminance per pixel.

Figure 4:
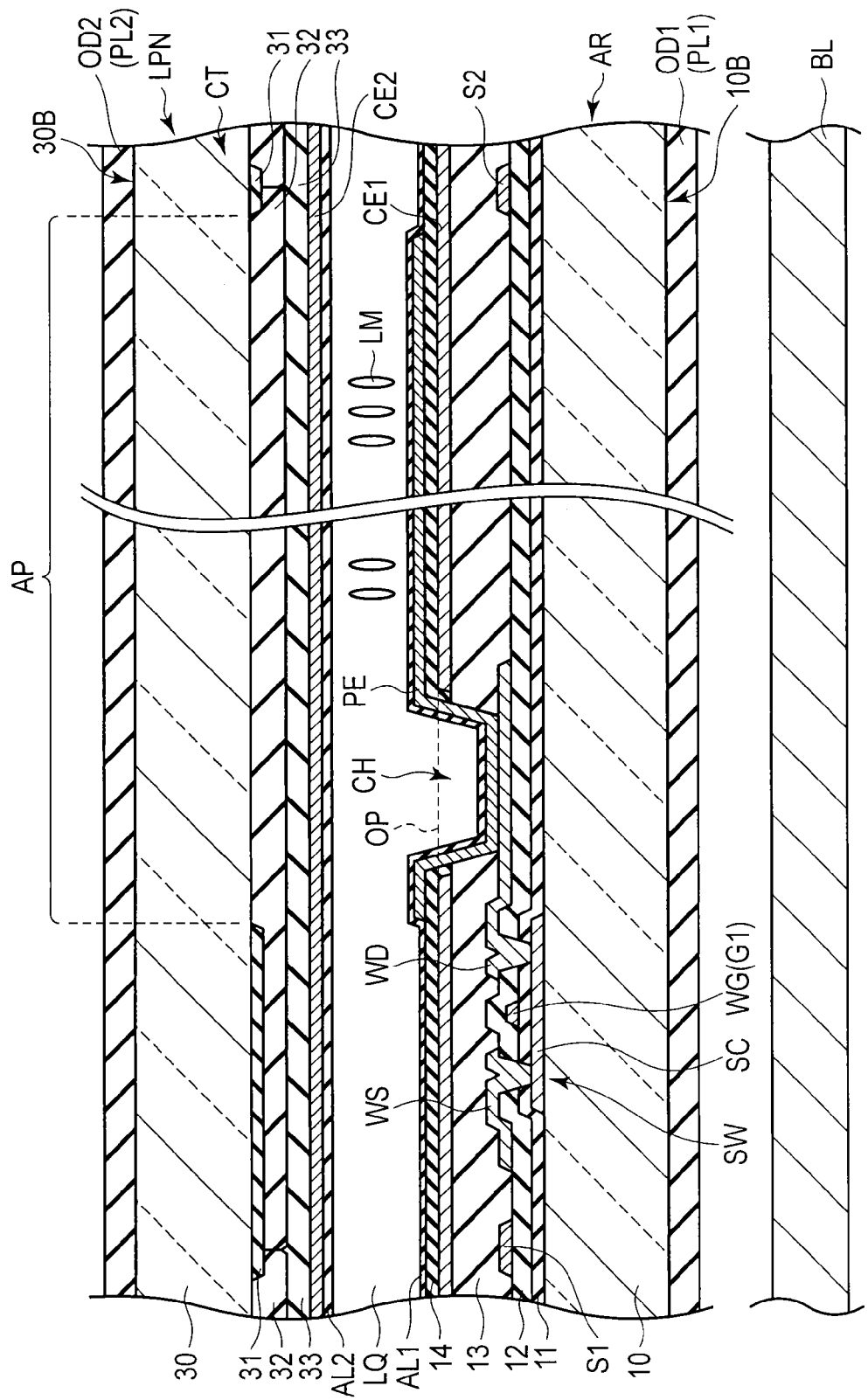
FIG. 4 is a view which schematically illustrates a cross-sectional structure of the liquid crystal display panel LPN in an active area including a switching element SW shown in FIG. 2.

FIG. 4 is a view which schematically illustrates a cross-sectional structure of the liquid crystal display panel LPN in the active area including the switching element SW shown in FIG. 2.

The array substrate AR is formed by using a first insulative substrate 10 having light transmissivity, such as a glass substrate or a resin substrate. The array substrate AR includes, on that side of the first insulative substrate 10, which is opposed to the counter-substrate CT, a switching element SW, a first common electrode CE1, a pixel electrode PE, a first insulation film 11, a second insulation film 12, a third insulation film 13, a fourth insulation film 14, and a first alignment film AL1.

In the example illustrated, the switching element SW is a thin-film transistor of a top gate type. The switching element SW includes a semiconductor layer SC which is disposed on the first insulative film 10. In the meantime, an undercoat layer, which is an insulation film, may be interposed between the first insulative substrate 10 and the semiconductor layer SC. The semiconductor layer SC is covered with the first insulation film 11. The first insulation film 11 is also disposed on the first insulative substrate 10.

A gate electrode WG of the switching element SW is formed on the first insulation film 11, and is located immediately above the semiconductor layer SC. The gate electrode WG is electrically connected to the gate line G1 (or formed integral with the gate line G1) and is covered with the second insulation film 12. The second insulation film 12 is also disposed on the first insulation film 11.

A source electrode WS and a drain electrode WD of the switching element SW are formed on the second insulation film 12. The source line S1 and source line S2 are similarly formed on the second insulation film 12. The source electrode WS illustrated is electrically connected to the source line S1 (or formed integral with the source line S1). The source electrode WS and drain electrode WD are put in contact with the semiconductor layer SC via contact holes penetrating the first insulation film 11 and second insulation film 12. The switching element SW with this structure, as well as the source line S1 and source line S2, is covered with the third insulation film 13. The third insulation film 13 is also disposed on the second insulation film 12. This third insulation film 13 is formed of, for example, a transparent resin material. The third insulation film 13 corresponds to a first interlayer insulation film which covers the source line S1, source line S2 and switching element SW.

The first common electrode CE1 extends over the third insulation film 13. As illustrated in the Figure, the first common electrode CE1 covers the upper side of the source line S1 and source line S2, and extends toward neighboring pixels. The first common electrode CE1 is formed of a transparent, electrically conductive material such as indium tin oxide (ITO) or indium zinc oxide (IZO). The fourth insulation film 14 is disposed on the first common electrode CE1. A contact hole CH, which penetrates to the drain electrode WD, is formed in the third insulation film 13 and fourth insulation film 14 at a position overlapping the opening OP. The fourth insulation film 14 has a less thickness than the third insulation film 13, and is formed of, for example, an inorganic material such as silicon nitride. The fourth insulation film 14 corresponds to a second interlayer insulation film which covers the first common electrode CE1.

The pixel electrode PE is formed in an island shape on the fourth insulation film 14 and is opposed to the first common electrode CE1. The pixel electrode PE is electrically connected to the drain electrode WD of the switching element SW via the contact hole CH. This pixel electrode PE functions as a transmissive electrode or a reflective electrode. The transmissive electrode is formed of a transparent, electrically conductive material such as ITO or IZO. The reflective electrode is formed of a reflective metallic material such as aluminum (Al), titanium (Ti), silver (Ag), molybdenum (Mo), tungsten (W), copper (Cu), or chromium (Cr). The pixel electrode PE is covered with the first alignment film AL1.

On the other hand, the counter-substrate CT is formed by using a second insulative substrate 30 with light transmissivity, such as a glass substrate or a resin substrate. The counter-substrate CT includes, on that side of the second insulative substrate 30, which is opposed to the array substrate AR, a light-shield layer 31, color filters 32, an overcoat layer 33, a second common electrode CE2, and a second alignment film AL2.

The light-shield layer 31 partitions each pixel PX in the active area ACT, and forms an aperture portion AP. The light-shield layer 31 is provided at boundaries between color pixels, or at positions opposed to the source lines and gate lines provided on the array substrate AR, or at a position opposed to the switching element SW. The light-shield layer 31 is formed of a light-shielding metallic material or a black resin material.

The color filter 32 is formed in the aperture portion AP, and a part thereof overlaps the light-shield layer 31. The color filters 32 include a red color filter formed of a resin material which is colored in red, a green color filter formed of a resin material which is colored in green, and a blue color filter formed of a resin material which is colored in blue. The red color filter is disposed in a red pixel which displays red, the green color filter is disposed in a green pixel which displays green, and the blue color filter is disposed in a blue pixel which displays blue. In addition, a white (or transparent) color filter is disposed in a white pixel which displays white. Incidentally, no color filter may be disposed in the white pixel, or only the overcoat layer 33 may be disposed in the white pixel. Besides, the white color filter may not strictly be an achromatic color filter, and may be a color filter which is lightly colored (e.g. colored in light yellow). Boundaries between the color filters 32 of different colors are located at positions overlapping the light-shield layer 31 above the source lines S.

The overcoat layer 33 covers the color filters 32. The overcoat layer 33 planarizes asperities of the light-shield layer 31 and color filters 32. The overcoat layer 33 is formed of, for example, a transparent resin material. The overcoat layer 33 serves as an underlayer of the second common electrode CE2.

The second common electrode CE2 is formed on that side of the overcoat layer 33, which is opposed to the array substrate AR. As illustrated in the Figure, the second common electrode CE2 extends above the source line S1 and source line S2, and extends toward the neighboring pixels. The second common electrode CE2 is formed of, for example, a transparent, electrically conductive material such as ITO or IZO. The second common electrode CE2 is covered with the second alignment film AL2.

The first alignment film AL1 and second alignment film AL2 are formed of a material which exhibits vertical alignment properties, and have an alignment restriction force which aligns liquid crystal molecules LM in a normal direction of the substrate, without requiring alignment treatment such as rubbing.

The above-described array substrate AR and counter-substrate CT are disposed such that their first alignment film AL1 and second alignment film AL2 are opposed to each other. In this case, a predetermined cell gap is created between the array substrate AR and the counter-substrate CT by columnar spacers which are formed on one of the array substrate AR and counter-substrate CT. The array substrate AR and counter-substrate CT are attached by a sealant in the state in which the cell gap is created. The liquid crystal layer LQ is sealed in the cell gap between the first alignment film AL1 and second alignment film AL2. The liquid crystal layer LQ is composed of a liquid crystal material with a negative (negative-type) dielectric constant anisotropy.

A backlight unit BL is disposed on the back side of the liquid crystal display panel LPN having the above-described structure. Various modes are applicable to the backlight unit BL, but a description of the detailed structure of the backlight unit BL is omitted here.

A first optical element OD1, which is a circular polarization element including a first polarizer PL1, is disposed on an outer surface 10B of the first insulative substrate 10. A second optical element OD2, which is a circular polarization element including a second polarizer PL2, is disposed on an outer surface 30B of the second insulative substrate 30. The first polarizer PL1 and second polarizer PL2 are disposed, for example, in a positional relationship of crossed Nicols in which their polarization axes are perpendicular to each other.

FIG. 5 is a plan view which schematically illustrates an example of a layout of pixels and color filters in the embodiment. In this example, the first direction X and second direction Y are perpendicular to each other.

A unit pixel for realizing color display is composed of a plurality of different color pixels. The unit pixel is a minimum unit which constitutes a color image that is displayed on the active area. In this example, two unit pixels, namely a unit pixel UP1 and a unit pixel UP2, which are arranged in the first direction X, are illustrated. Each of the unit pixel UP1 and unit pixel UP2 is composed of six color pixels.

The unit pixel UP1 is composed of a color pixel (first color pixel) PX11, a color pixel (second color pixel) PX12, a color pixel (third color pixel) PX13, a color pixel (fourth color pixel) PX14, a color pixel (fifth color pixel) PX15 and a color pixel (sixth color pixel) PX16. In the Figure, each color pixel has a rectangular shape with a pair of short sides in the first direction X, and a pair of long sides in the second direction Y, and each color pixel is indicated by a one-dot-and-dash line. The color pixel PX12 is a pixel of a color different from the color of the color pixel PX11 and neighbors the color pixel PX11 in the first direction X. The color pixel PX13 is a pixel of a color different from the colors of the color pixel PX11 and color pixel PX12 and neighbors the color pixel PX12 in the first direction X. The color pixel PX14 is a pixel of the same color as the color pixel PX11 and neighbors the color pixel PX11 in the second direction Y. The color pixel PX15 is a pixel of the same color as the color pixel PX12 and neighbors the color pixel PX12 in the second direction Y. The color pixel PX16 is a pixel of a color different from the colors of the color pixel PX11, color pixel PX12 and color pixel PX13, and neighbors the color pixel PX13 in the second direction Y. In this example, the color pixel PX11 and color pixel PX14 are red pixels, the color pixel PX12 and color pixel PX15 are green pixels, the color pixel PX13 is a blue pixel, and the color pixel PX16 is a white pixel.

Each of the color pixel PX11, color pixel PX12, color pixel PX14 and color pixel PX15 has a long-side length L1 in the second direction Y. The color pixel PX13 has a long-side length L2 in the second direction Y, which is greater than the long-side length L1. The color pixel PX16 has a long-side length L3 in the second direction Y, which is less than the long-side length L1. In addition, each of the color pixel PX11, color pixel PX12, color pixel PX14 and color pixel PX15 has a short-side length S1 in the first direction X. Each of the color pixel PX13 and color pixel PX16 has a short-side length S2 in the first direction X, which is greater than the short-side length S1. In this structure, the areas of the color pixel PX11, color pixel PX12, color pixel PX14 and color pixel PX15 are substantially equal. The area of the color pixel PX13 is greater than the area of the color pixel PX11, etc., and is largest in the unit pixel UP1. The area of the color pixel PX16 is less than the area of the color pixel PX11, etc., and is smallest in the unit pixel UP1. For example, the sum of the areas of the color pixel PX11 and color pixel PX14, which are the red pixels, is equal to the sum of the areas of the color pixel PX12 and color pixel PX15, which are the green pixels, and is equal to the area of the color pixel PX13 which is the blue pixel.

The central portions of the color pixel PX11, color pixel PX12 and color pixel PX13, which are arranged in the first direction X, are located on the same straight line. Similarly, the central portions of the color pixel PX14, color pixel PX15 and color pixel PX16, which are arranged in the first direction X, are located on the same straight line. In the example illustrated, the color pixel PX13 is enlarged to both the upper side and lower side in the Figure in the second direction Y, compared to the color pixel PX12, and the color pixel PX16 is reduced in the second direction Y, compared to the color pixel PX15. Thus, a set of the color pixel PX13 and color pixel PX16 is displaced to the upper side in the Figure, relative to a set of the color pixel PX12 and color pixel PX15.

Each of the color pixel PX11, color pixel PX12, color pixel PX13, color pixel PX14 and color pixel PX15 corresponds to a pixel of a transmissive display mode, which includes a transmissive electrode as the pixel electrode PE. The color pixel PX16 corresponds to a pixel of a reflective display mode, which includes a reflective electrode as the pixel electrode PE.

The unit pixel UP2 has a configuration which is similar to the configuration of the unit pixel UP2, but the unit pixel UP2 is different from the unit pixel UP1 in that the white pixel and the blue pixel are transposed. Specifically, the unit pixel UP2 is composed of a color pixel PX21, a color pixel PX22, a color pixel PX23, a color pixel PX24, a color pixel PX25 and a color pixel PX26. The color pixel PX21 and color pixel PX24 are red pixels, the color pixel PX22 and color pixel PX25 are green pixels, the color pixel PX23 is a white pixel, and the color pixel PX26 is a blue pixel.

Light-shield layers 31 are disposed at boundaries of the respective color pixels. Each light-shield layer 31 extends linearly in the second direction Y. Incidentally, no light-shield layer 31 may be disposed at a boundary between color pixels of the same color. In the example illustrated, no light-shield layer 31 is disposed at a boundary between the color pixel PX11 and color pixel PX14, or between the color pixel PX12 and color pixel PX15. The light-shield layer 31 is disposed at a boundary between color pixels of different colors. Specifically, the light-shield layer 31 extending linearly in the first direction X is disposed at a boundary between the color pixel PX13 and color pixel PX16. Thus, each of the color pixel PX13 and color pixel PX16 is surrounded by the light-shield layers 31.

A color filter (first color filter) 32R is formed in a strip shape extending in the second direction Y. A color filter (second color filter) 32G neighbors the color filter 32R in the first direction X, and is formed in a strip shape extending in the second direction Y. A color filter (third color filter) 32B neighbors the color filter 32G in the first direction X, and is formed in an island shape. A color filter (fourth color filter) 32W neighbors the color filter 32B in the second direction Y, neighbors the color filter 32G in the first direction X, and is formed in an island shape. The color filter 32B and color filter 32W are alternately disposed in the second direction Y. For example, the color filter 32R is a red (R) color filter, the color filter 32G is a green (G) color filter, the color filter 32B is a blue (B) color filter, and the color filter 32W is a white (W) color filter.

The color filter 32R is disposed to correspond to the color pixels PX11 and color pixel PX14 of the unit pixel UP1, and is disposed to correspond to the color pixels PX21 and color pixel PX24 of the unit pixel UP2. The color filter 32G is disposed to correspond to the color pixels PX12 and color pixel PX15 of the unit pixel UP1, and is disposed to correspond to the color pixels PX22 and color pixel PX25 of the unit pixel UP2. The color filter 32B is disposed to correspond to the color pixel PX13 of the unit pixel UP1, and is disposed to correspond to the color pixel PX26 of the unit pixel UP2. The color filter 32W is disposed to correspond to the color pixel PX16 of the unit pixel UP1, and is disposed to correspond to the color pixels PX23 of the unit pixel UP2.

The color filter 32R and color filter 32G have an equal width in the first direction X. The color filter 32B and color filter 32W have an equal width in the first direction X, and this width is greater than the width of the color filter 32R, etc. Mutually neighboring end portions of the color filters overlap the light-shield layers 31.

Figure 6:
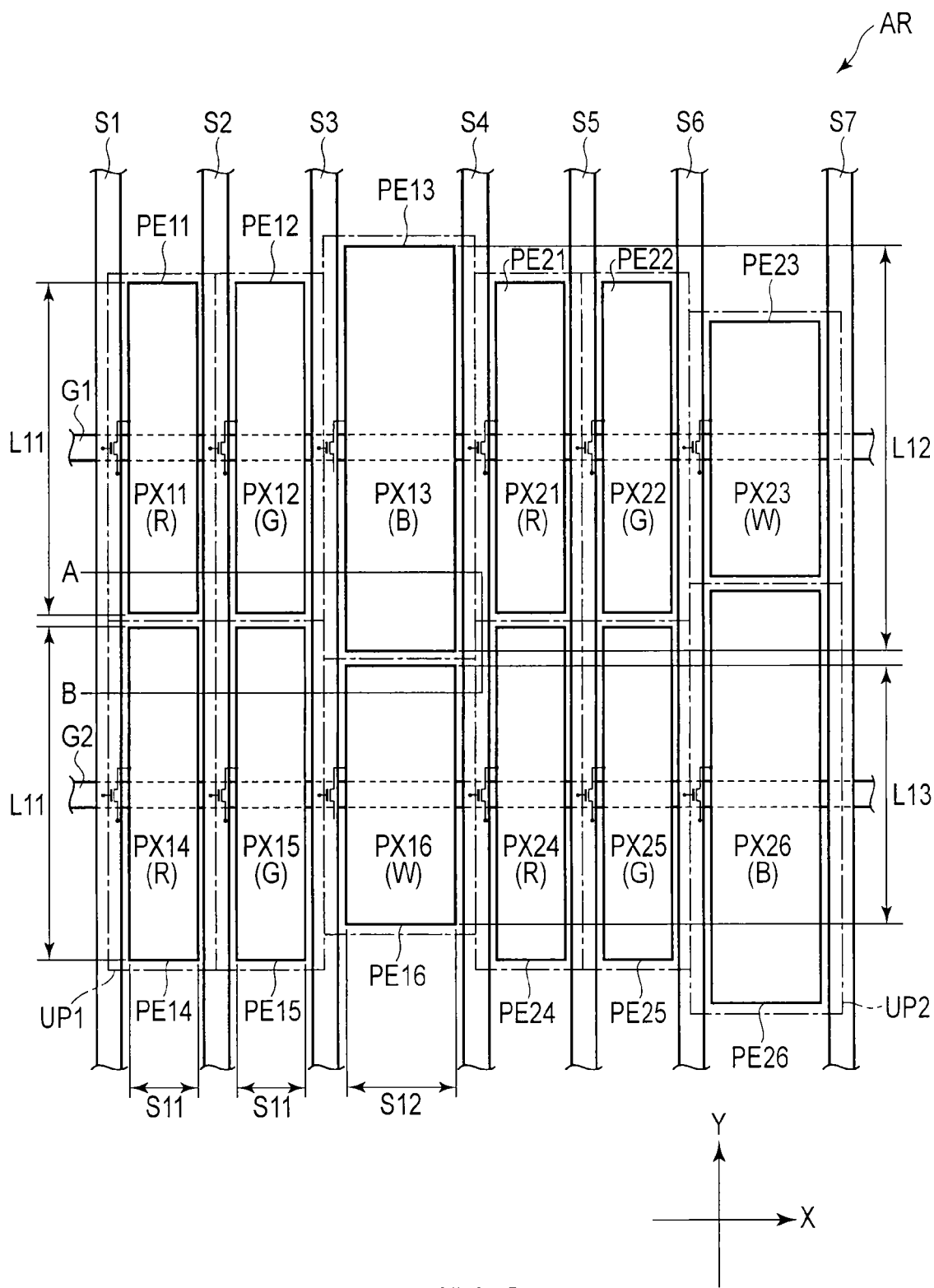
FIG. 6 is a plan view which schematically illustrates a structure example of an array substrate AR to which the color filters shown in FIG. 5 are applied.

FIG. 6 is a plan view which schematically illustrates a structure example of an array substrate AR to which the color filters shown in FIG. 5 are applied. In this example, only the structure of the array substrate AR, which is necessary for the description, is illustrated, and the depiction of the first common electrode, etc. is omitted.

A gate line G1 extends in the first direction X and crosses central portions of the color pixel PX11, color pixel PX12, color pixel PX13, color pixel PX21, color pixel PX22 and color pixel PX23. A gate line G2 extends in the first direction X and crosses central portions of the color pixel PX14, color pixel PX15, color pixel PX16, color pixel PX24, color pixel PX25 and color pixel PX26.

A pixel electrode (first transmissive electrode) PE11 is disposed to correspond to the color pixel PX11, and is connected to a source line S1 via a switching element which is connected to the gate line G1. A pixel electrode (second transmissive electrode) PE12 is disposed to correspond to the color pixel PX12 and neighbors the pixel electrode PE11 in the first direction X. The pixel electrode PX12 is connected to a source line S2 via a switching element which is connected to the gate line G1. A pixel electrode (third transmissive electrode) PE13 is disposed to correspond to the color pixel PX13 and neighbors the pixel electrode PE12 in the first direction X. The pixel electrode PX13 is connected to a source line S3 via a switching element which is connected to the gate line G1. A pixel electrode (fourth transmissive electrode) PE14 is disposed to correspond to the color pixel PX14 and neighbors the pixel electrode PE11 in the second direction Y. The pixel electrode PX14 is connected to the source line S1 via a switching element which is connected to a gate line G2. A pixel electrode (fifth transmissive electrode) PE15 is disposed to correspond to the color pixel PX15 and neighbors the pixel electrode PE12 in the second direction Y. The pixel electrode PX15 is connected to the source line S2 via a switching element which is connected to the gate line G2. A pixel electrode (reflective electrode) PE16 is disposed to correspond to the color pixel PX16 and neighbors the pixel electrode PE13 in the second direction Y. The pixel electrode PX16 is connected to the source line S3 via a switching element which is connected to the gate line G2.

Each of the pixel electrode PE11, pixel electrode PE12, pixel electrode PE14 and pixel electrode PE15 has a long-side length L11 in the second direction Y. The pixel electrode PE13 has a long-side length L12 in the second direction Y, which is greater than the long-side length L11. The pixel electrode PE16 has a long-side length L13 in the second direction Y, which is less than the long-side length L11. Each of the pixel electrode PE11, pixel electrode PE12, pixel electrode PE14 and pixel electrode PE15 has a short-side length S11 in the first direction X. Each of the pixel electrode PE13 and pixel electrode PE16 has a short-side length S12 in the first direction X, which is greater than the short-side length S11. In this structure, the pixel electrode PE11, the areas of the pixel electrode PE12, pixel electrode PE14 and pixel electrode PE15 are substantially equal. The area of the pixel electrode PE13 is greater than the area of the color pixel PE11, etc., and is largest in the unit pixel UP1. The area of the pixel electrode PE16 is less than the area of the pixel electrode PE11, etc., and is smallest in the unit pixel UP1.

Incidentally, the pixel electrode PE21 is disposed to correspond to the color pixel PX21, the pixel electrode PE22 is disposed to correspond to the color pixel PX22, the pixel electrode PE23 is disposed to correspond to the color pixel PX23, the pixel electrode PE24 is disposed to correspond to the color pixel PX24, the pixel electrode PE25 is disposed to correspond to the color pixel PX25, and the pixel electrode PE26 is disposed to correspond to the color pixel PX26.

Incidentally, the layout shown in FIG. 5 and FIG. 6 is merely an example, and the layout is not limited to this example. Specifically, in a layout in which a unit pixel is composed of six color pixels of 2 rows×3 columns, if the white pixel is a pixel of a reflective display mode, the layout is not limited to the illustrated one.

Figure 7:
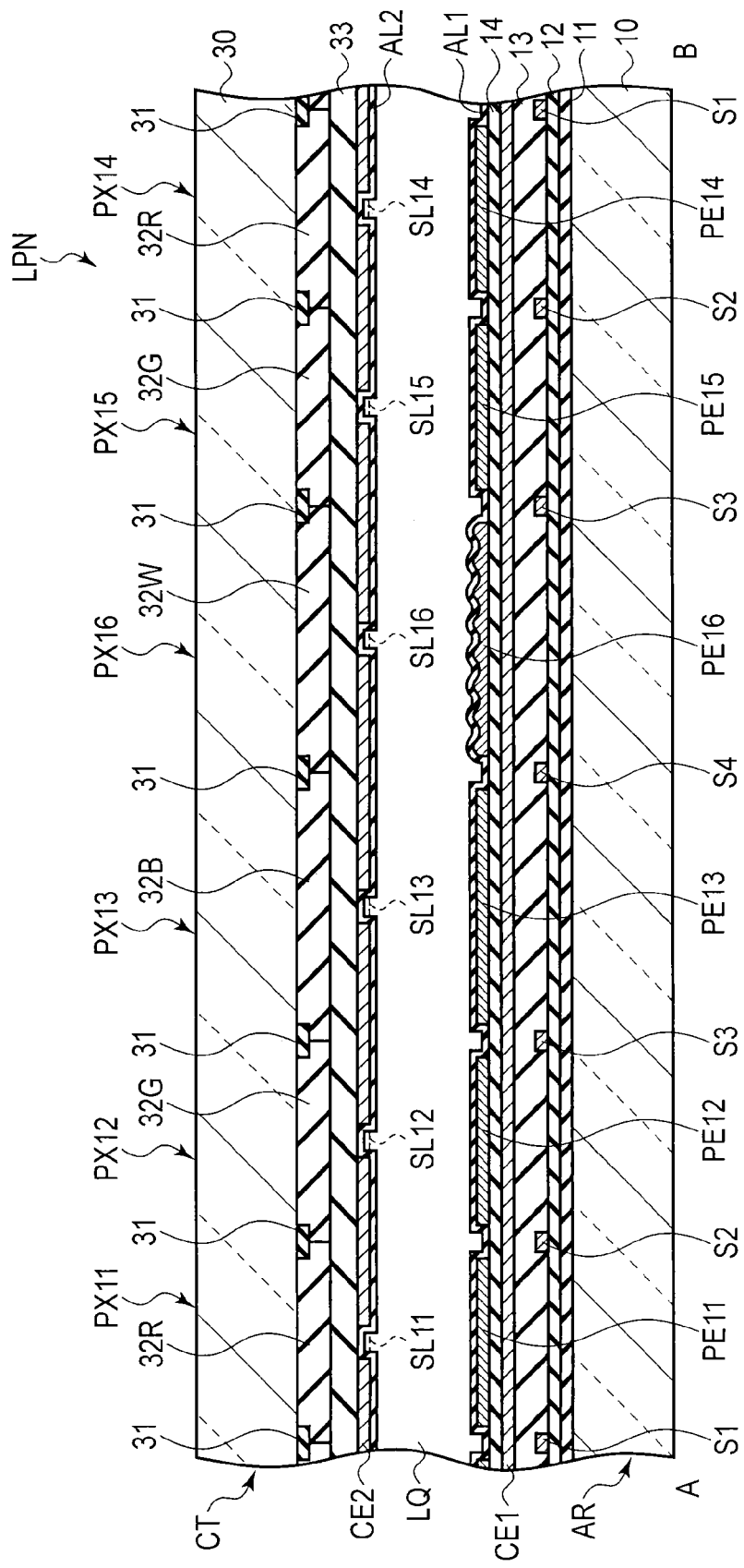
FIG. 7 is a cross-sectional view which schematically illustrates a cross-sectional structure of the liquid crystal display panel LPN at a time when the array substrate AR shown in FIG. 6 is cut along line A-B.

FIG. 7 is a cross-sectional view which schematically illustrates a cross-sectional structure of the liquid crystal display panel LPN at a time when the array substrate AR shown in FIG. 6 is cut along line A-B.

In the array substrate AR, the source lines S1 to S4 are formed on the second insulation film 12 and are covered with the third insulation film 13. The first common electrode CE1 is formed on the third insulation film 13 and is covered with the fourth insulation film 14. The pixel electrodes PE11 to PE16 are formed on the fourth insulation film 14 and are covered with the first alignment film AL1. The pixel electrodes PE11 to PE15 are formed of a transparent, electrically conductive material. The pixel electrode PE16 is formed of a reflective metallic material. Asperities are formed on the surface of the pixel electrode PE16. The pixel electrodes PE11 and PE14 are located between the source line S1 and source line S2. The pixel electrodes PE12 and PE15 are located between the source line S2 and source line S3. The pixel electrodes PE13 and PE16 are located between the source line S3 and source line S4.

In the counter-substrate CT, the light-shield layers 31 are located above the source lines S1 to S4, respectively. The color filter 32R is opposed to the pixel electrode PE11 and pixel electrode PE14. The color filter 32G is opposed to the pixel electrode PE12 and pixel electrode PE15. The color filter 32B is opposed to the pixel electrode PE13. The color filter 32W is opposed to the pixel electrode PE16. The second common electrode CE2 is formed on the array substrate AR side of the overcoat layer 33, and is covered with the second alignment film AL2. The second common electrode CE2 is opposed to the pixel electrodes PE11 to PE16. Slits SL11 to SL16 are formed in the second common electrode CE2 at positions opposed to the pixel electrodes PE11 to PE16, respectively.

The cell gaps of the color pixels PX11 to PX15 of the transmissive display mode are substantially equal to each other, and are also substantially equal to the cell gap of the color pixel PX16 of the reflective display mode. Specifically, the cell gaps at positions opposed to the pixel electrodes PE11 to PE16 are substantially equal to each other. In the present embodiment, the cell gap corresponds to the thicknesses of the liquid crystal layer LQ. In the meantime, the cell gap of the color pixel PX16 may be made smaller than the cell gap of the color pixel PX11, etc. In this case, the cell gap of the color pixel PX16 can be adjusted by providing a projection as an underlayer of the pixel electrode PE16 or an underlayer of the second common electrode CE2. However, since an alignment defect of liquid crystal molecules tends to occur due to a stepped portion of the projection, it is desirable to make the cell gap of the color pixel PX16 equal to the cell gaps of the color pixels of the transmissive display mode, without providing a stepped portion, as in the illustrated example.

Next, the operation of the display device in the embodiment is described.

In an OFF state in which no potential difference is produced between the pixel electrode PE and the first common electrode CE1 and second common electrode CE2 (i.e. a state in which no voltage is applied to the liquid crystal layer LQ), no electric field is produced between the pixel electrode PE and second common electrode CE2. Thus, as illustrated in FIG. 4, liquid crystal molecules LM included in the liquid crystal layer LQ are initially aligned substantially perpendicular to the substrate major surface (X-Y plane) between the first alignment film AL1 and second alignment film AL2.

At this time, in each of the color pixels PX11 to PX15 which correspond to the pixels of the transmissive display mode, part of light from the backlight unit BL passes through the first optical element OD1, is converted to circularly polarized light, and enters the liquid crystal display panel LPN. The polarization state of the circularly polarized light (e.g. clockwise circularly polarized light), which enters the liquid crystal display panel LPN, hardly varies when the light passes through the liquid crystal layer LQ. Thus, the circularly polarized light (clockwise circularly polarized light) emerging from the liquid crystal display panel LPN is absorbed by the second optical element OD2 (black display).

In addition, in the color pixel PX16 which corresponds to the pixel of the reflective display mode, part of ambient light, which is incident on the liquid crystal display panel LPN, passes through the second optical element OD2, is converted to circularly polarized light, and enters the liquid crystal display panel LPN. The polarization state of the circularly polarized light (e.g. counterclockwise circularly polarized light) hardly varies when the light passes through the liquid crystal layer LQ, but is converted to circular polarized light in the opposite direction (clockwise circular polarized light) when reflected by pixel electrode PE16, and is absorbed by the second optical element OD2 (black display).

In an ON state in which a potential difference is produced between the pixel electrode PE and the first common electrode CE1 and second common electrode CE2 (i.e. a state in which a voltage is applied to the liquid crystal layer LQ), a vertical electric field or an inclined electric field avoiding the slits SL is produced between the pixel electrode PE and second common electrode CE2. Thus, the liquid crystal molecules LM are aligned in a direction different from the initial alignment direction, by the effect of the vertical electric field or inclined electric field. Specifically, since negative-type liquid crystal molecules LM are aligned such that their major axes cross the electric field, the liquid crystal molecules LM are aligned in the ON state in an oblique direction or in a horizontal direction, relative to the substrate major surface.

In this ON state, the polarization state of the circularly polarized light, which enters the liquid crystal display panel LPN, varies depending on the alignment state of the liquid crystal molecules LM (or the retardation of the liquid crystal layer LQ) when the light passes through the liquid crystal layer LQ. Thus, in the ON state, at least part of the circularly polarized light emerging from the liquid crystal layer LQ passes through the second optical element OD2.

Specifically, in the color pixels PX11 to PX15 of the transmissive display mode, the circularly polarized light (clockwise circularly polarized light), which has passed through the first optical element OD1, is converted to the circularly polarized light in the opposite direction (counterclockwise circularly polarized light) by a retardation of about ½ wavelength at the time of passing through the liquid crystal layer LQ, and emerges from the second optical element OD2 (white display).

In addition, in the color pixel PX16 of the reflective display mode, a retardation, which is given to light that once passes through the liquid crystal layer LQ, is about ¼ wavelength, and a retardation, which is given to light that once travels forward and backward through the liquid crystal layer LQ, is about ½ wavelength. Thus, the circularly polarized light (counterclockwise circularly polarized light), which has passed through the second optical element OD2, becomes the circularly polarized light in the opposite direction (clockwise circularly polarized light) when reflected by the pixel electrode PE16. However, this light becomes circularly polarized light in the opposite direction (counterclockwise circularly polarized light) by the retardation of about ½ wavelength at the time when the light has traveled forward and backward through the liquid crystal layer LQ, and thus emerges from the second optical element OD2 (white display).

Besides, in the ON state, a storage capacitance CS is formed by the pixel electrode PE and the first common electrode CE1 that are opposed to each other via the fourth insulation film 14, and retains a necessary capacitance for displaying an image. Specifically, a pixel potential, which has been written in each pixel via the switching element SW, is retained by the storage capacitance CS for a predetermined period.

According to the embodiment, when an image is displayed outdoors, ambient light is reflected at the white pixel of the reflective display mode, which is included in the unit pixel. Thus, the reflective light at the white pixel contributes to display. In a comparative example in which the unit pixel is composed of color pixels which are all in the transmissive display mode, when an image is displayed outdoors, ambient light is reflected and glare occurs. Thus, in order to secure visibility, it is necessary to turn on the backlight unit at a substantially maximum luminance. On the other hand, in the present embodiment, as the luminance of ambient light becomes higher, the ratio of contribution to display of the reflective light increases, and a clearer image can be obtained. In short, in this embodiment, when an image is displayed outdoors, the display luminance is improved, compared to the comparative example. Thus, the visibility of an image in the outdoors can be secured, without driving the backlight unit at high luminance (or by turning on the backlight unit at a luminance which is equal to a luminance necessary when an image is displayed outdoors). Therefore, an increase in power consumption can be suppressed.

In the meantime, when an image is displayed outdoors, there is a concern that a shift in hue occurs due to the effect of ambient light. However, in ambient light, it is more desirable to place priority on securing visibility than to place importance on color reproducibility. In the present embodiment, however, in the unit pixel, although monochromatic display is effected at the white pixel of the reflective display mode, color display can be effected at the red pixel, green pixel and blue pixel of the transmissive display mode. Thus, when an image is displayed outdoors, it is possible to maintain color display while securing visibility, although the hue becomes lighter.

In the liquid crystal display device, there is no small influence of optical rotatory dispersion occurring in the liquid crystal layer. Thus, such a phenomenon occurs that the hue of light from the backlight unit, which passes through the liquid crystal layer, varies depending on the tilt angle of liquid crystal molecules (or the display gray level) (in particular, white display at an intermediate gray level becomes bluish). This phenomenon is called "blue shift", in some cases. To cope with this problem, the hue can be adjusted by independently setting voltage values for respective gray levels, in each of the red pixel, green pixel and blue pixel. However, a variation of hue, which occurs in the white pixel alone cannot sufficiently be corrected. In addition, when the white pixel is included in the unit pixel, the degree of influence of the white pixel upon the luminance of the unit pixel is high. Thus, even if the hue as a whole, including the hues of the red pixel, green pixel and blue pixel, is to be adjusted, there is a case in which the hue cannot fully be corrected.

According to the present embodiment, when an image is displayed indoors, the influence of ambient light is small, and hence the ratio of contribution to display of the reflective light at the white pixel is small. Thus, the hue of the unit pixel can be corrected by adjusting the luminance of each of the red pixel, green pixel and blue pixel of the transmissive display mode. Therefore, according to the unit pixel structure of the embodiment, it becomes possible to improve the color reproducibility in the indoors, compared to the unit pixel structure including the white pixel of the transmissive display mode.

In addition, as described above, when an image is displayed outdoors, priority is placed on securing visibility, over color reproducibility. Thus, according to the embodiment, since the reflective light at the white pixel contributes to display, the visibility can be secured without enhancing the luminance of the backlight unit.

Moreover, according to the embodiment, the capacitance, which is necessary for displaying an image in each pixel, can be produced between the pixel electrode PE and first common electrode CE1 which are opposed via the fourth insulation film 14. Thus, when the capacitance is formed, a wiring line or electrode, which crosses the pixel and is formed of a light-shielding wiring material, does not need to be provided in addition to the first common electrode CE1. In addition, the fourth insulation film 14 is formed to have a smaller film thickness than the third insulation film that is formed of a resin material or the like. Therefore, a relatively large capacitance can easily be formed by the pixel electrode PE and first common electrode CE1 which are disposed via the fourth insulation film 14.

In addition, the first common electrode CE1 extends above the source line S1 and source line S2. Thus, in the ON state, an undesired leak electric field from the source line S1 and source line S2 toward the liquid crystal layer LQ can be shielded by the first common electrode CE1. Specifically, it is possible to suppress formation of an undesired electric field or an undesired capacitance between the source line S1 and source line S2 and the pixel electrode PE or second common electrode CE2, and to suppress disturbance in alignment of liquid crystal molecules LM in an area overlapping the source line S1 and source line S2.

Furthermore, in the area overlapping the source line S1 and source line S2, the first common electrode CE1 and second common electrode CE2 are opposed to each other. Thus, the liquid crystal molecules LM in the area overlapping the source line S1 and source line S2 maintain the initial alignment state even in the ON state, since the first common electrode CE1 and second common electrode CE2 are kept at the same potential. Therefore, pixel electrodes PE neighboring in the first direction X can be located closer to each other up to a processing limit, and the area per pixel which contributes to display can further be increased.

Besides, even when one of the pixels, which neighbor with the source line interposed, is in the ON state and the other is in the OFF state, there is no potential difference between the mutually opposed first common electrode CE1 and second common electrode CE2 in the area overlapping the source line between the ON-state pixel and OFF-state pixel, and thus the liquid crystal molecules LM in this area are kept in the initial alignment state. Therefore, even when the liquid crystal display panel LPN is viewed in an oblique direction, degradation in display quality due to color mixing can be suppressed. In addition, since there is no need to increase the width of the light-shield layer 31 in order to prevent color mixing, the area per pixel contributing to display can further be increased.

In the meantime, in the present embodiment, the columnar spacers should desirably be disposed at positions overlapping the light-shield layers 31 (i.e. positions overlapping the gate lines and source lines), but the alignment of liquid crystal molecules tends to be disturbed in the vicinity of the columnar spacers. Thus, when the columnar spacers are disposed near the color pixel of the transmissive display mode, there is a concern that a display defect, such as light leak, occurs due to the disturbance of liquid crystal molecules in the color pixel. In addition, with the development in microfabrication, the width of various wiring lines has become finer. Even if the columnar spacers are disposed at a position overlapping the wiring line, there is a concern that a part of columnar spacers overlaps the color pixel, leading to a decrease in aperture ratio of the color pixel. It is thus desirable to dispose the columnar spacers at the color pixel PX16 of the reflective display mode in the unit pixel of the above-described structure. In the color pixel PX16, for example, even if the alignment of liquid crystal molecules is disturbed in the vicinity of columnar spacers, the reflective light at the color pixel PX16 hardly contributes to display, at a time of indoor display which is little affected by ambient light, and the display quality is not degraded. In addition, in the other color pixels PX11 to PX15 of the transmissive display mode, no disturbance in alignment of liquid crystal molecules occurs due to the columnar spacers, and there is no loss in aperture ratio. At a time of outdoor display with a high luminance of ambient light, priority is placed on securing visibility, as described above. Thus, even if disturbance in alignment of liquid crystal molecules occurs in the color pixel PX16, the visibility does not lower due to the disturbance in alignment, if the intensity of reflective light is sufficiently secured.

In the meantime, in the present embodiment, since the unit pixel includes the color pixels of the transmissive display mode and the color pixel of the reflective display mode, as described above, it is desirable that a liquid crystal application voltage-normalized transmittance (V-T) characteristic in the transmissive display mode and a liquid crystal application voltage-normalized reflectance (V-R) characteristic in the reflective display mode be made uniform. Specifically, when display of an identical gray level value is effected, it is desirable that the normalized transmittance of the transmissive display mode and the normalized reflectance of the reflective display mode be substantially equal.

In the example illustrated in FIG. 7, the cell gap of each of the color pixels PX11 to PX15 of the transmissive display mode is substantially equal to the cell gap of the color pixel PX16 of the reflective display mode. Thus, the optical path length of light passing through the liquid crystal layer in the color pixel PX16 of the reflective display mode is about double the optical path length of light passing through the liquid crystal layer in the color pixels PX11 to PX 15 of the transmissive display mode. In this structure, it is necessary to make uniform the retardation of the liquid crystal layer at a time when backlight passes through the color pixels PX11 to PX15 and the retardation of the liquid crystal layer at a time when ambient light is reflected by the color pixel PX16. Next, a method for uniformizing the V-T characteristic and V-R characteristic is described.

FIG. 8 is a view for explaining a relationship of a normalized transmittance and a normalized reflectance, relative to a liquid crystal application voltage.

The abscissa indicates a voltage applied to the liquid crystal layer in the transmissive display mode and reflective display mode, and the ordinate indicates a normalized transmittance and a normalized reflectance at a time when the transmittance and reflectance of the minimum gray level value (OFF state) is set at zero and the transmittance and reflectance of the maximum gray level value is set at 100. In the present embodiment, as regards the red pixel, green pixel and blue pixel, these pixels are set at substantially equal V-T characteristics. As regards the white pixel, the V-R characteristic is set such that the normalized reflectance thereof becomes substantially equal to the normalized transmittance at the same gray level value. As is clear from the illustrated V-T characteristic and V-R characteristic, as regards the voltage values which are set relative to the identical gray level value, the value of the reflective display mode is lower than the value of the transmissive display mode. Specifically, relative to the identical gray level value, the voltage applied to the pixel electrode PE16, which is the reflective electrode, is lower than the voltage applied to the pixel electrodes PE11 to PE15 which are transmissive electrodes.

For example, the ON voltage corresponding to the maximum gray level value in the color pixel of the transmissive display mode is set at 4 V, and the ON voltage corresponding to the maximum gray level value in the color pixel of the reflective display mode is 3 V. Thereby, the V-T characteristic and the V-R characteristic are made substantially equal.

Figure 9:
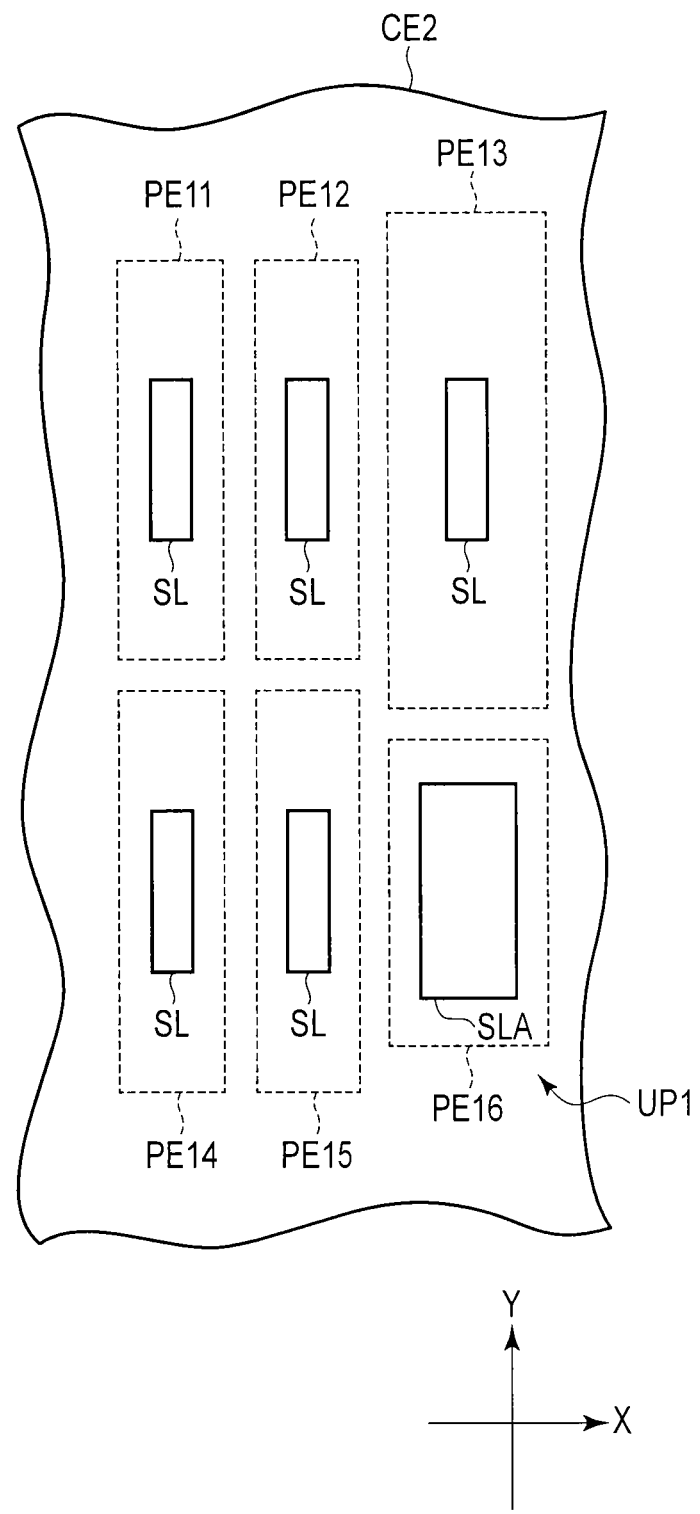
FIG. 9 is a plan view which schematically illustrates another structure example of a second common electrode CE2 which is opposed to pixel electrodes PE11 to PE16 of the array substrate AR shown in FIG. 6.

FIG. 9 is a plan view which schematically illustrates another structure example of the second common electrode CE2 which is opposed to the pixel electrodes PE11 to PE16 of the array substrate AR shown in FIG. 6.

The second common electrode CE2 is opposed to the pixel electrodes PE11 to PE16. In the second common electrode CE2, slits SL are formed at positions opposed to the pixel electrodes PE11 to PE15, and a slit SLA is formed at a position opposed to the pixel electrode PE16. The slits SL have substantially the same shape and substantially the same area. In the example illustrated, each slit SL has a vertically elongated shape extending in the second direction Y. The area of the slit SLA is greater than the area of the slit SL. In the example illustrated, the slit SLA has a vertically elongated shape extending in the second direction Y, but the slit SLA is enlarged both in the first direction X and second direction Y, compared to the slits SL.

According to this structure example, in the color pixel of the reflective display mode, since the slit SLA with the large area is formed in the second common electrode CE2, the voltage applied to the liquid crystal layer LQ is weakened. Specifically, even if the same voltage is applied to the pixel electrodes PE11 to PE15 and to the pixel electrode PE16, relative to the same gray level value, the electric field, which is formed between the pixel electrode PE16 and the second common electrode CE2 is weaker than the electric field which is formed between the pixel electrode PE11 and PE15 and the second common electrode CE2. Thus, in the color pixel of the reflective display mode, the variation of the alignment state of liquid crystal molecules is smaller than in the color pixels of the transmissive display mode, and accordingly the retardation of the liquid crystal layer LQ is also smaller. Thereby, an equal modulation ratio can be obtained in the color pixels of the transmissive display mode and in the color pixel of the reflective display mode, and the V-T characteristic and the V-R characteristic can be made substantially equal.

As has been described above, according to the present embodiment, a liquid crystal display device, which can suppress an increase in power consumption, can be provided.

In the above-described embodiment, the liquid crystal display panel LPN of the VA (Vertical Aligned) mode has been described by way of example. However, the embodiment is also applicable to other modes, for instance, a mode which mainly uses a vertical electric field, such as a TN (Twisted Nematic) mode or an OCB (Optically Compensated Bend) mode, or a mode which mainly uses a lateral electric field, such as an IPS (In-Plane Switching) mode or an FFS (Fringe Field Switching) mode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a first transmissive electrode, a second transmissive electrode neighboring the first transmissive electrode in a first direction, a third transmissive electrode neighboring the second transmissive electrode in the first direction, a fourth transmissive electrode neighboring the first transmissive electrode in a second direction, a fifth transmissive electrode neighboring the second transmissive electrode in the second direction, and a reflective electrode neighboring the third transmissive electrode in the second direction;
a second substrate including a first color filter extending in the second direction and opposed to the first transmissive electrode and the fourth transmissive electrode, a second color filter extending in the second direction and opposed to the second transmissive electrode and the fifth transmissive electrode, a third color filter opposed to the third transmissive electrode, and a fourth color filter opposed to the reflective electrode; and
a liquid crystal layer held between the first substrate and the second substrate,
wherein the first color filter is a red color filter, the second color filter is a green color filter, the third color filter is a blue color filter, and the fourth color filter is a white color filter.

2. The liquid crystal display device of claim 1, wherein areas of the first transmissive electrode, the second transmissive electrode, the fourth transmissive electrode and the fifth transmissive electrode are substantially equal.

3. The liquid crystal display device of claim 2, wherein an area of the third transmissive electrode is greater than the area of the first transmissive electrode.

4. The liquid crystal display device of claim 2, wherein an area of the reflective electrode is less than the area of the first transmissive electrode.

5. The liquid crystal display device of claim 1, wherein, relative to an identical gray level value, a voltage applied to the reflective electrode is lower than a voltage applied to the first transmissive electrode.

6. The liquid crystal display device of claim 1, wherein the second substrate further includes a common electrode opposed to the first to fifth transmissive electrodes and the reflective electrode, and
slits are formed in the common electrode at positions opposed to the first to fifth transmissive electrodes and the reflective electrode.

7. The liquid crystal display device of claim 6, wherein an area of the slit at the position opposed to the reflective electrode is greater than an area of the slit at the position opposed to the first transmissive electrode.

8. The liquid crystal display device of claim 6, wherein the first substrate further includes a first vertical alignment film covering the first to fifth transmissive electrodes and the reflective electrode, and
the second substrate further includes a second vertical alignment film covering the common electrode.

9. The liquid crystal display device of claim 1, wherein cell gaps at positions opposed to the first to fifth transmissive electrodes and the reflective electrode are substantially equal.

10. A liquid crystal display device comprising:
a first substrate including a first common electrode, a first transmissive electrode opposed to the first common electrode, a second transmissive electrode opposed to the first common electrode and neighboring the first transmissive electrode in a first direction, a third transmissive electrode opposed to the first common electrode and neighboring the second transmissive electrode in the first direction, and a reflective electrode opposed to the first common electrode and neighboring the third transmissive electrode in a second direction;

a second substrate including a first color filter opposed to the first transmissive electrode, a second color filter opposed to the second transmissive electrode, a third color filter opposed to the third transmissive electrode, a fourth color filter opposed to the reflective electrode, and a second common electrode opposed to the first to third transmissive electrodes and the reflective electrode and having a potential equal to a potential of the first common electrode; and a liquid crystal layer held between the first substrate and the second substrate, wherein the first color filter is a red color filter, the second color filter is a green color filter, the third color filter is a blue color filter, and the fourth color filter is a white color filter.

11. The liquid crystal display device of claim 10, wherein areas of the first transmissive electrode and the second transmissive electrode are substantially equal.

12. The liquid crystal display device of claim 11, wherein an area of the third transmissive electrode is greater than the area of the first transmissive electrode.

13. The liquid crystal display device of claim 11, wherein an area of the reflective electrode is less than the area of the first transmissive electrode.

14. The liquid crystal display device of claim 10, wherein, relative to an identical gray level value, a voltage applied to the reflective electrode is lower than a voltage applied to the first transmissive electrode.

15. The liquid crystal display device of claim 10, wherein slits are formed in the second common electrode at positions opposed to the first to third transmissive electrodes and the reflective electrode.

16. The liquid crystal display device of claim 15, wherein an area of the slit at the position opposed to the reflective electrode is greater than an area of the slit at the position opposed to the first transmissive electrode.

17. he liquid crystal display device of claim 10, wherein the first substrate further includes a first vertical alignment film covering the first to third transmissive electrodes and the reflective electrode, and the second substrate further includes a second vertical alignment film covering the second common electrode.

18. The liquid crystal display device of claim 10, wherein cell gaps at positions opposed to the first to third transmissive electrodes and the reflective electrode are substantially equal.

* * * * *